United States Patent [19]

Mleczko

[11] Patent Number: 5,645,506
[45] Date of Patent: Jul. 8, 1997

[54] VARIABLE DRIVE TRANSMISSION

[76] Inventor: Alexander E. Mleczko, 6506 Hwy 72, Stillman Valley, Ill. 61084

[21] Appl. No.: 530,025

[22] Filed: Sep. 19, 1995

[51] Int. Cl.⁶ ............................................ F16H 3/74
[52] U.S. Cl. ....................... 475/257; 475/258; 475/104
[58] Field of Search .............................. 475/31, 32, 91, 475/93, 94, 102, 103, 104, 108, 149, 257, 258

[56] References Cited

U.S. PATENT DOCUMENTS

| | | | |
|---|---|---|---|
| 1,797,826 | 3/1931 | Gage | 475/258 X |
| 1,919,607 | 5/1933 | Blackstock | 475/257 |
| 2,091,391 | 8/1937 | Hale | 475/257 |
| 2,151,151 | 3/1939 | Perez | 475/258 |
| 2,276,908 | 3/1942 | Schmid | 475/104 |
| 2,500,763 | 3/1950 | Lowndes | 475/257 |
| 3,174,601 | 3/1965 | Whinery et al. | 192/61 |
| 3,332,302 | 7/1967 | Watermann | 473/31 |
| 3,351,168 | 11/1967 | Thorpe | 192/61 |
| 4,007,649 | 2/1977 | Stirland | 74/803 |
| 4,091,901 | 5/1978 | F'Geppert | 192/61 |
| 4,407,401 | 10/1983 | Rosendahl et al. | 192/61 |
| 5,186,692 | 2/1993 | Gleasman et al. | 475/82 |
| 5,222,921 | 6/1993 | Garcia | 475/72 |

*Primary Examiner*—Khoi Q. Ta
*Attorney, Agent, or Firm*—Jacobson, Price, Holman & Stern, PLLC

[57] ABSTRACT

An infinitely variable ratio transmission is provided including coaxial first and second rotary shafts. A rotary carrier is journaled relative to the shafts and axially spaced first and second sun gears are mounted on the first and second shafts, respectively, for rotation therewith. The carrier includes sets of axially spaced first and second planet gears journaled therefrom and meshed with the first and second sun gears, respectively. Selectively operable first rotation inhibiting structure is provided operative to gradually inhibit rotation of the carrier and second selectively operable rotation inhibiting structure is provided operable to gradually inhibit orbiting of the first planet gears about the first sun gear.

6 Claims, 3 Drawing Sheets

VARIABLE DRIVE TRANSMISSION

BACKGROUND OF THE INVENTION

1. Field of the Invention

This invention relates to an infinitely variable ratio drive transmission including two sets of planet and sun gears operatively associated with input and output shafts, respectively, and wherein a single carrier housing is provided from which the first and second planet gears (drivingly connected for equal rotation) are journaled. The carrier housing drives a first hydraulic pump whose discharge may be variably throttled and the first planet and sun gear set also function as a gear pump whose discharge may be variably throttled.

2. Description of the Related Art

Various different forms of variable speed hydraulic couplings, automatic transmissions, infinitely variable gearing assemblies, hydrostatic couplings and other transmissions and gear change mechanisms heretofore have been provided utilizing some of the individual structural components of the instant invention. Examples of these previously known devices are disclosed in U.S. Pat. Nos. 3,174,601, 3,351,168, 4,007,649, 4,091,901, 4,407,401, 5,186,692 and 5,222,921. However, these previously known devices do not include the overall combination of structural and operational features included in the instant invention.

SUMMARY OF THE INVENTION

Most variable speed hydraulic couplings or transmissions experience appreciable power losses due to power consumed by pumping hydraulic fluid and further experience high internal operating temperatures under heavy working conditions.

The transmission of the instant invention has been designed to greatly lessen these operating conditions and yet still utilize a minimum of relatively noncomplex operating components.

The main object of this invention is to provide a variable speed drive transmission, primarily for motorized vehicles, which will provide infinitely variable drive ratios between predetermined numerically high and low ratios.

Another object of this invention is to provide a variable drive ratio transmission in which the drive components thereof are continuously bathed in lubricating hydraulic fluid and which utilizes two internal pumps with the variable discharge of one pump serving as a control for varying the discharge of the second pump.

Still another important object of this invention is to provide a variable drive transmission incorporating an exterior reservoir (which may be cooled when desired) thereby enabling the internal working temperature of the transmission to be advantageously controlled.

A further object of this invention is to provide a variable speed drive transmission which may be readily constructed of various sizes so as to handle various operating loads.

A final object of this invention to be specifically enumerated herein is to provide a variable drive transmission in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
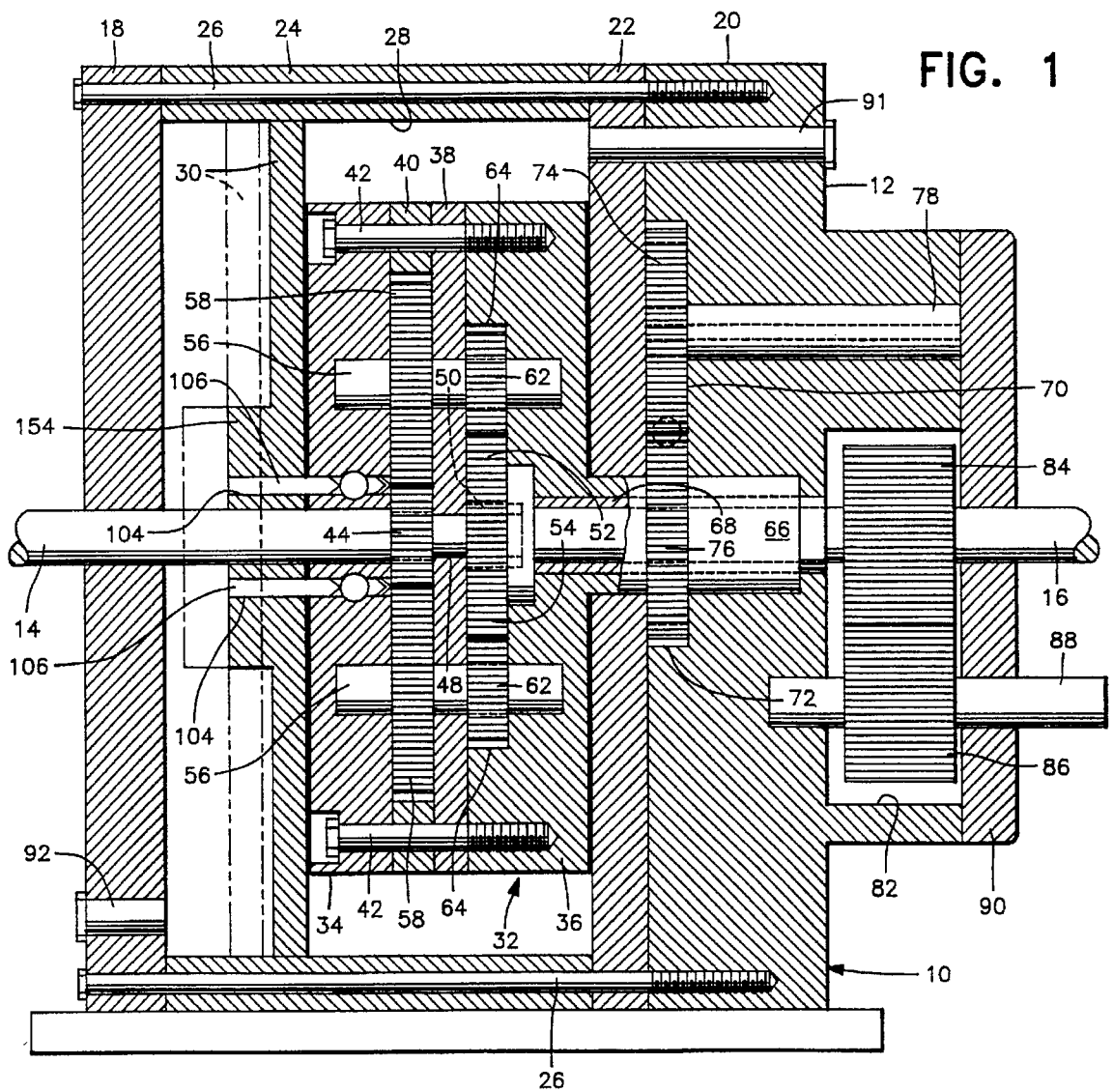
FIG. 1 is a longitudinal vertical sectional view of the variable drive transmission.

Referring now more specifically to the drawings the numeral 10 generally designates the transmission of the instant invention which has been specifically designed to transmit driving power for a motorized vehicle, but which may be used to great advantage in many other different power transfer applications.

The transmission 10 includes a case 12 into one end of which a power input shaft 14 projects and from the other end of which a driving shaft 16 projects. The case 12 includes opposite end plates 18 and 20 and an intermediate plate 22 and barrel 24 disposed between the end plates 18 and 20, a plurality of threaded fasteners 26 being used to tightly clamp the plate 22 and barrel 24 between the end plates 18 and 20.

The barrel 24 defines an internal cylindrical cavity 28 and a cylindrical control plate 30 is slidingly and rotatably received in the end of the cavity 28 remote from the intermediate plate 30.

A carrier assembly referred to in general by the reference numeral 32 is journaled within the cavity 28 in a manner to be hereinafter more fully set forth and includes carrier ends 34 and 36 between which spacer and pump plates 38 and 40 are clamped, the carrier ends 34 and 36 being removably joined together through the utilization of threaded fasteners 42.

The inner end of the power input shaft 14 disposed within the cavity 28 rotatably and slidably supports the control plate 30 thereon and also rotatably supports the end plate 34 and the spacer plate 38 thereon, a sun gear 44 being mounted on the shaft 14 for rotation therewith within a central cavity area 46 formed centrally in the pump plate 40. The input shaft 14, inwardly of the sun gear 44, is journaled through the center of the spacer plate 38 as at 48 and also within a sleeve bearing 50 contained within a second sun gear 52 disposed in a similar but larger central cavity area 54 formed in the carrier end 36.

A pair of planet gear shafts 56 have their opposite end portions journaled in the carrier ends 34 and 36 and their midportions journaled through the spacer plate 38. The shafts 56 have planet gears 58 mounted thereon for rotation therewith in gear cavities 60 formed in the pump plate 40 and communicating with the central cavity area 46, the gears 58 being meshed with the sun gear 44. In addition, planet gears 62 are mounted on the shafts 56 for rotation therewith in gear cavities 64 formed in the carrier end 36, the gears 62 being meshed with the sun gear 52.

The carrier end 36 includes a tubular shaft portion 66 journaled in the end plate 20 and containing a sleeve bearing 68 through which the driving shaft 16 is journaled, the driving shaft 16 having the sun gear 52 fixed thereon.

The end plate 20 includes communicating gear cavities 70 and 72 formed therein in which pump gears 74 and 76 are received, the pump gear 74 being mounted on a shaft 78 journaled through the end plate 20 and the gear 76 being mounted upon the tubular shaft portion for rotation therewith.

Further, the end plate 20 includes an outwardly opening recess 82 in which a first gear 84 mounted on the shaft 16 is disposed as well as a second gear 86, meshed with gear 84, mounted on a reverse rotation shaft 88 journaled from the end plate 20. A cover plate 90 is removably secured over the recess 82 and journals the shafts 16 and 88.

Figure 8:
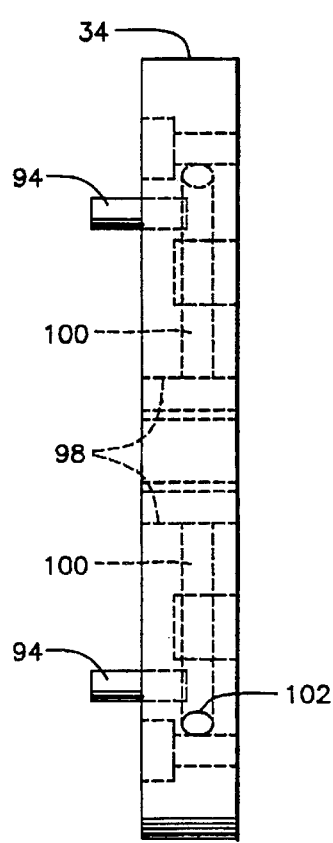
FIG. 8 is a side elevational view of the structure illustrated in FIG. 7.

The case 12 includes a hydraulic fluid return fitting 91 opening outwardly of the upper portion of the cavity 28 through the end plate 20 and a hydraulic fluid inlet fitting 92 opening into a lower portion of the cavity 28 through the end plate 18. Still further, the carrier end 34 includes axially outwardly projecting pins 94 snugly and slidably received through corresponding bores 95 formed through the control plate 30 whereby the latter is keyed to the carrier end 34 for rotation therewith and the carrier end 34 includes a pair of hydraulic fluid inlet ports 96 formed therethrough as well as hydraulic outlet ports 98 formed therein opening into the radial innermost ends of a pair of radial discharge passages 100 extending radially outwardly from the outlet ports 98 and opening outwardly through the outer periphery of the carrier end as at 102, see FIG. 8.

Figure 5:
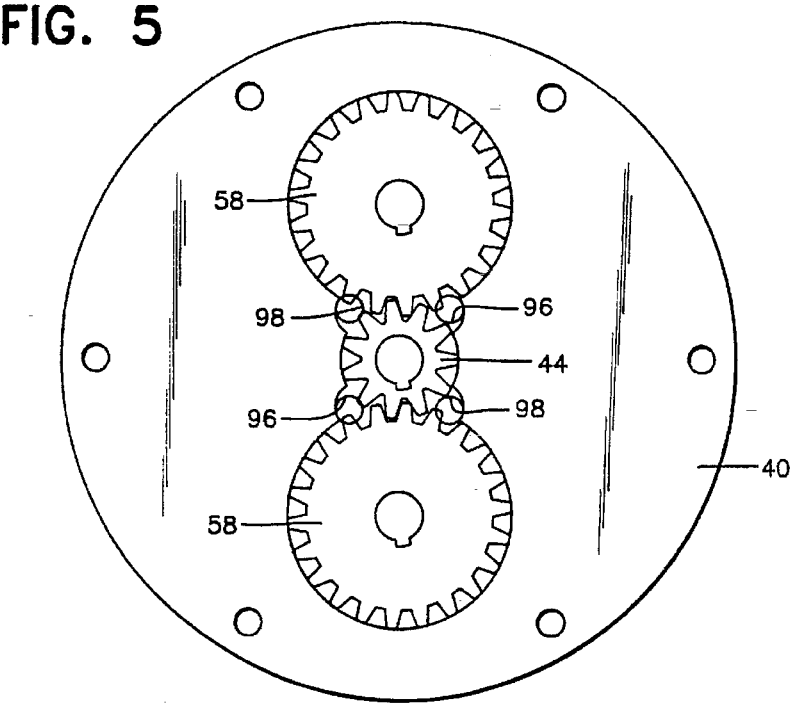
FIG. 5 is an elevational view of the combined second gear pump and first planet and sun gear set.
Figure 6:
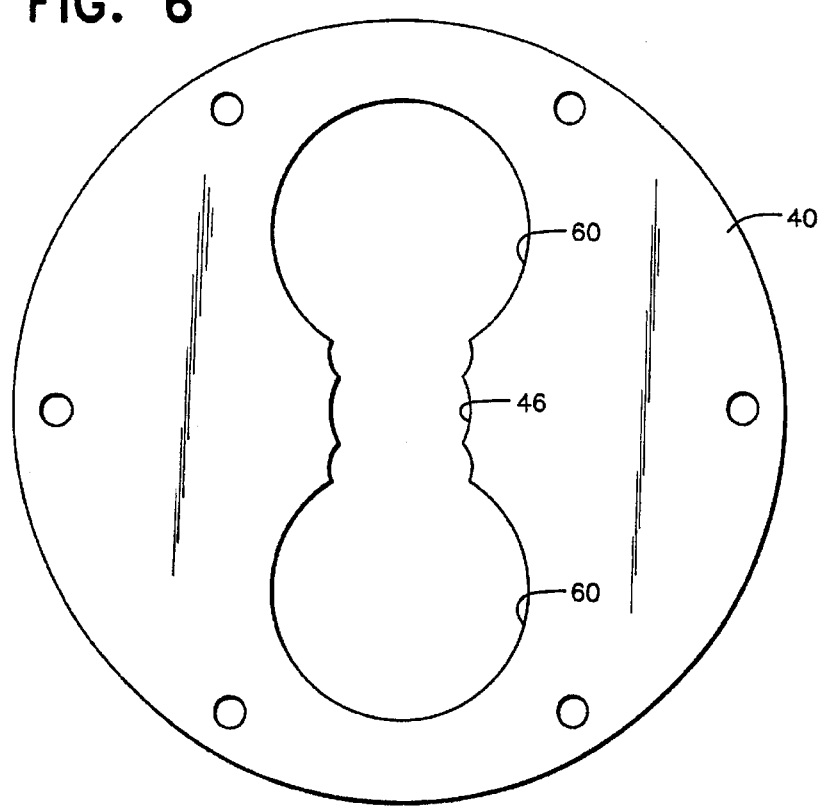
FIG. 6 is an elevation view of the housing plate of the second gear pump.
Figure 7:
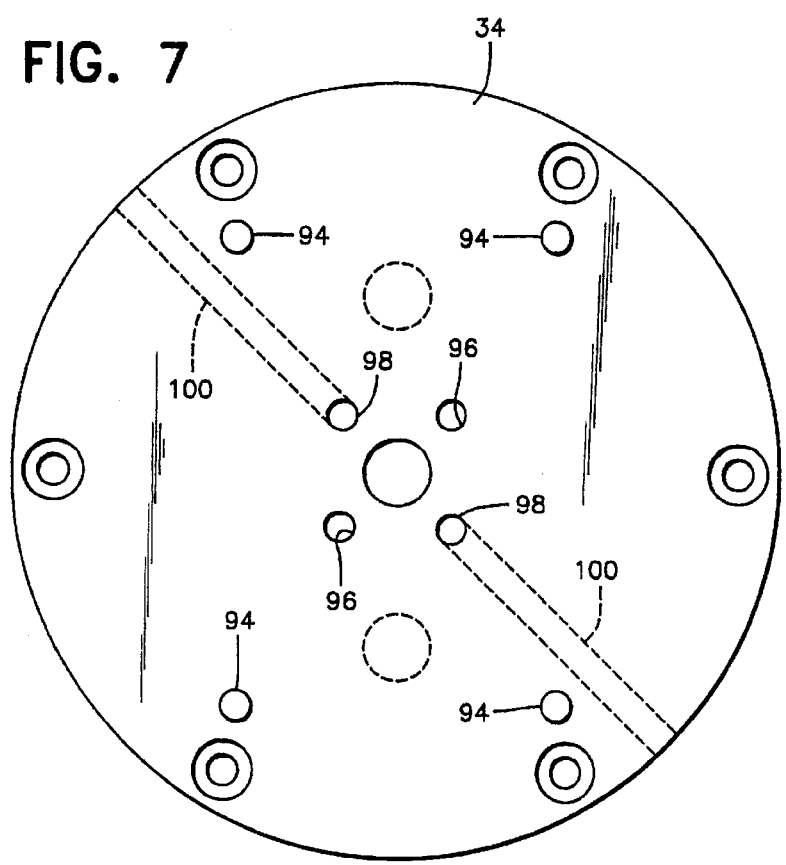
FIG. 7 is an end elevational view of the valve plate of the second gear pump.

The control plate 30 includes a pair of first passages 104 formed therethrough in which threaded metering rods 106 are adjustably threadingly mounted and the first passages 104 are registered with the outlet ports 98 for adjustably metering the flow of hydraulic oil therethrough into the discharge passages 100. In addition, the control plate 30 includes a second pair of passages 107 registered with the inlet ports 96 and from FIG. 5 of the drawings it will be noted that the inlet ports 96 comprise inlet ports for the pumps defined by the meshed sun and planet gears 44 and 58, the passages 107 may be provided with adjustable metering valves, if desired. Of course, the outlet ports 98 comprise outlet ports for the pumps shown in FIG. 5 and are therefor operative to convey pumped hydraulic fluid through the ports 98 and into the discharge passages 100, see FIG. 7.

Figure 2:
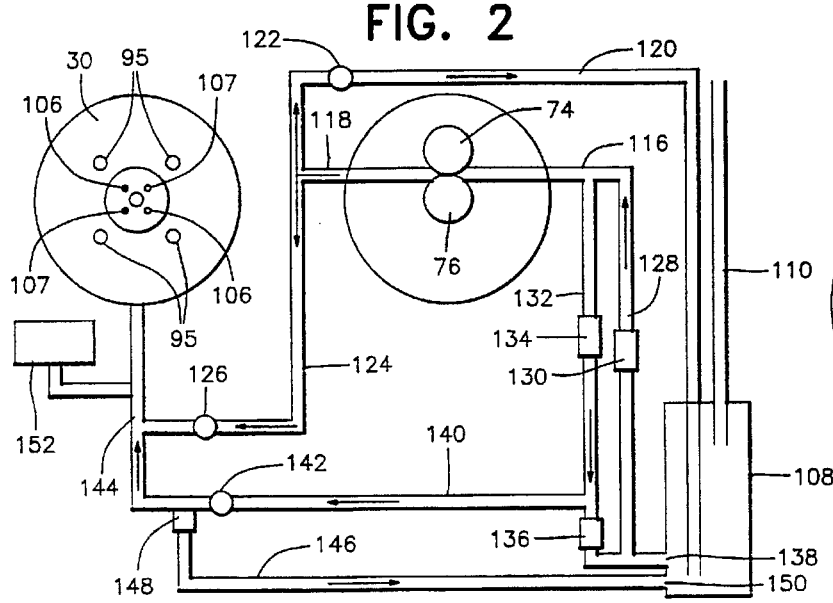
FIG. 2 is a diagrammatic view of the hydraulic circuitry of the transmission.
Figure 3:
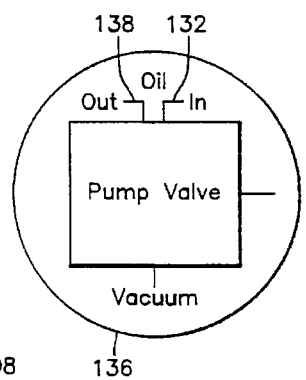
FIG. 3 is a schematic view of the engine vacuum controlled hydraulic fluid flow controlling valve of the first pump of the transmission.
Figure 4:
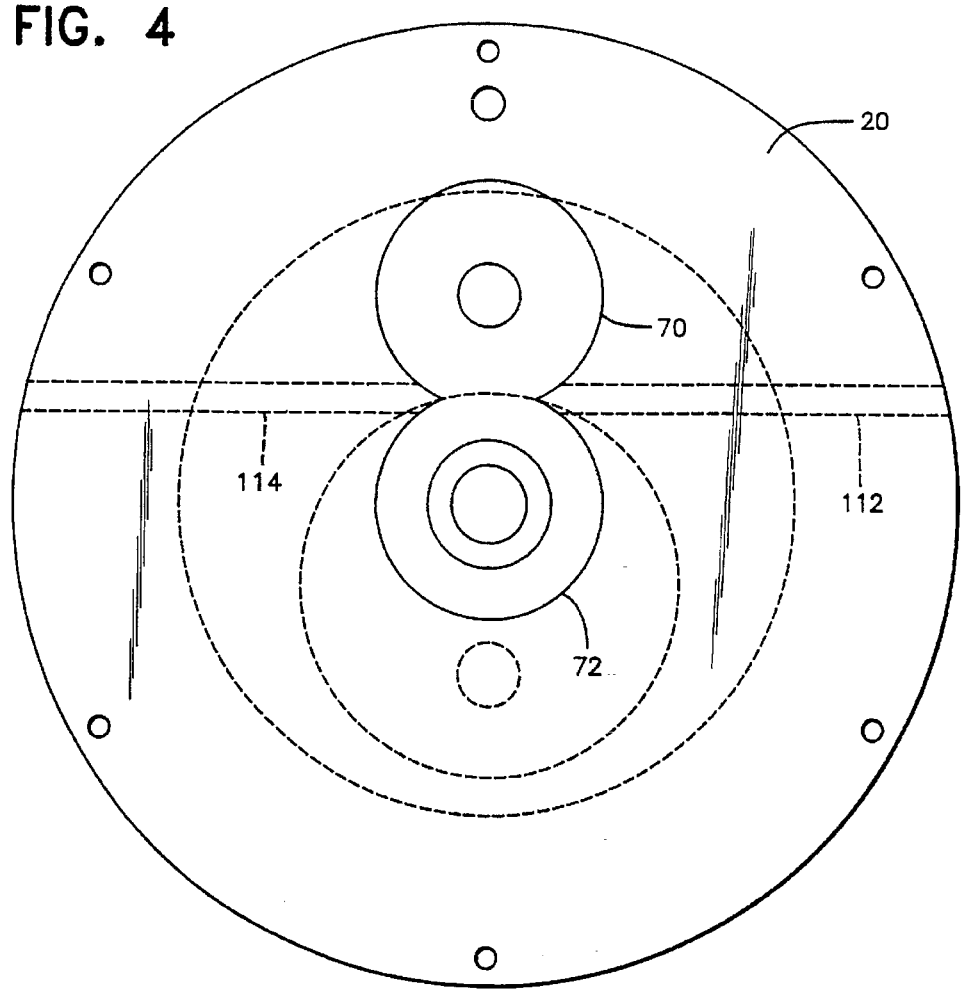
FIG. 4 is an end elevational view of the first hydraulic pump housing.

With attention now invited more specifically to FIG. 2, there may be seen a hydraulic fluid reservoir 108 including a return line 110 opening thereinto from the return fitting 90. In addition, the end plate 20 includes combined inlet and outlet ports 112 and 114 formed therein opening inwardly into the intersection between the gear cavities 70 and 72 and outwardly into lines 116 and 118, respectively.

Line 118 opens into line 120 returning to the reservoir 108 and has an adjustable metering valve 122 serially connected therein. Line 118 also opens into line 124 having an adjustable metering and one way valve 126 serially connected therein. Line 116 opens into a supply line 128 having a one way valve 130 serially connected therein and also opens into a return line 132 having a one way valve 134 serially connected therein. The end of the line 132 remote from the line 116 has a vacuum controlled throttle valve 136 serially connected therein and opens into the reservoir as at 138, the end of the line 128 remote from the line 116 opening into the line 134 intermediate the reservoir 138 and the vacuum controlled throttle valve 136.

A line 140 opens into the line 132 intermediate the one way valve 134 and the vacuum controlled throttle valve 136 and has a one way adjustable metering valve 142 serially connected therein. The lines 124 and 140, down stream from the valves 126 and 142, open into a line 144 opening into the cavity 28. A return line 146 having a solenoid actuated valve 148 serially connected therein opens into the line 140 down stream from the valve 142 and into the reservoir 108 as at 150.

In operation, and assuming that the transmission 10 will be utilized to propel a vehicle, the input shaft 14 is driven in a clockwise direction by the motor of the vehicle and the output shaft 16 is coupled to the driving wheels or the like of the vehicle for driving the vehicle forward when the shaft 16 is turning in a clockwise direction. The shaft 88 is driven in a counterclockwise direction from the gear 84 on the shaft 16 and may alternately be coupled to the driving wheels or the like of the associated vehicle in order to propel the vehicle in reverse.

With the shaft 14 turning in a clockwise direction as viewed from the left of FIG. 1, the plate 30 in the phantom line position thereof illustrated in FIG. 1 and the throttle valve 136 in an open position, the sun gear 44 drives the planet gears 58 counterclockwise and the entire carrier assembly 32 turns in a counterclockwise direction about the input shaft 14, the brakes of the associated vehicle preventing the shaft 16 and thus the sun gear 52 from turning. Thereafter, as the vehicle engine increases rotational speed of the shaft 14 and the engine vacuum actuated valve 136 begins to close, the discharge of hydraulic fluid pumped by the gears 74 and 76 through the port 112 is throttled in order to retard rotation of the gear 76 and thus rotation of the carrier assembly 32. Assuming that the engine vacuum drops sufficiently to completely throttle the discharge of hydraulic fluid from the pump represented by the gears 74 and 76, rotation of the carrier assembly 32 is at least substantially terminated and the shaft 14 drives the shaft 16 through the two planet gear sets at a 4-to-1 ratio, the gear 44 being ½ the diameter of the gears 58 and the gears 62 being ½ the diameter of the gear 52.

Then, as the vehicle accelerates and the engine vacuum increases, the valve 136 beings to open while in the meantime hydraulic fluid has been gradually pumped into the cavity 28 to the left of the control plate 30 as viewed in FIG. 1 and the control plate 30 is gradually shifted to the right as viewed in FIG. 1 in order that the metering rods or pistons 106 may begin to gradually throttle the discharge of hydraulic fluid from the double pump comprising the gears 44 and 58. Thus, rotation of the carrier assembly 32 is retarded and the drive numerical ratio between the shafts 14 and 16 beings to drop from 4-to-1 toward 1-to-1.

As engine vacuum further increases and the throttle valve 136 is more fully closed, rotation of the carrier assembly 32 in a counterclockwise direction slows still further and the plate 30 is further shifted to the right resulting in the discharge of hydraulic fluid from the double pump represented by the gears 44 and 58 being even more greatly throttled.

Eventually, as the driving ratio continues to shift from 4-to-1 toward 1-to-1, rotation of the carrier assembly 32 in a counterclockwise direction is terminated and the carrier assembly beings to rotate in a clockwise direction. Throughout this phase of operation the pump gears 74 and 76 are not pumping hydraulic fluid but a supply of hydraulic fluid under pressure has built up in the accumulator 152 communicated with the line 144 and the plate 30 continues to shift toward its limit position of shifting to the right as viewed in FIG. 1 of the drawings.

Thereafter, as the throttle valve 136 is further closed the pump gears 74 and 76 begin to rotate in counterclockwise and clockwise directions, respectively, and pump hydraulic fluid into the line 124, through the valve 126 and into the cavity 28 to the left of the plate 30. This of course causes the plate 30 to further shift to the right as viewed in FIG. 1 to its limit position whereby hydraulic fluid flow through the outlet ports 98 and discharge passages 100 is completely terminated to thus substantially prevent any relative rotation between the gear 44 and the gears 58. At this point, the sun and planet gear sets in the carrier 32 do not rotate relative to the carrier 32 and the carrier 32 rotates in a clockwise direction at the same speed as the shaft 14 thereby enabling the gears 62 to rotate the gear 52 and the shaft 16 in a clockwise direction at a rotational speed equal to the speed of rotation of the shaft 14, or at a 1-to-1 ratio.

Assuming that the vehicle is traveling at cruising speed and the shaft 14 is driving the shaft 16 independent of any relative rotation therebetween, if a lower gear ratio (numerically higher) is suddenly needed for passing, the accelerator pedal of the associated vehicle is fully depressed in order to actuate and open the solenoid valve 148. This of course relieves the pressure in the line 144 and enables the discharge of hydraulic fluid from the pump gears 74 and 76 through the lines 118, 124 and 144 to be reduced and the plate 30 to be shifted at least slightly back toward the phantom line position thereof in FIG. 1 in order to back the metering rods 106 out of the ports 98, thereby enabling the pump gears 44 and 58 to pump oil from the cavity 28 to the left of the plate 30 outwardly of the carrier assembly 32 and into the cavity 28 to the right of the plate 30 as viewed in FIG. 1. This of course enables relative rotation between the planet and sun gears 44 and 58 and between the planet and sun gears 62 and 52 to thereby increase the gear ratio from 1-to-1 toward a 4-to-1 ratio. Of course, when the vehicle has passed the vehicle being overtaken and throttle pressure is reduced, engine vacuum is increased and the valve 136 beings to close and additional hydraulic fluid is pumped through the line 144 into the cavity 128 to the left of the plate 130 so as to again shift the plate 30 toward the solid line position thereof illustrated in FIG. 1 with the outlet ports 98 being at least substantially fully throttled. This again prevents relative rotation between the sun and planet gears 44 and 58 and between the planet gears and sun gear 62 and 52 to thereby cause the transmission 10 to drive the output shaft 16 at a 1-to-1 ratio from the input shaft 14.

It is pointed out that in lieu of a vacuum valve such as the vacuum valve 136, other types of valves under the control of electronic computer output signals could be used.

The foregoing is considered as illustrative only of the principles of the invention. Further, since numerous other modifications and changes readily will occur to those skilled in the art, it is not desired to limit the invention to the exact construction and operation shown and described, and accordingly, all suitable modifications and equivalents may be resorted to, falling within the scope of the invention.

What is claimed as new is as follows:

1. An infinitely variable ratio transmission including coaxial first and second rotary shafts, a rotary carrier journaled relative to said shafts, axially spaced first and second sun gears mounted on said first and second shafts, respectively, for rotation therewith, said carrier including sets of axially spaced first and second planet gears journaled therefrom and meshed with said first and second sun gears, respectively, selectively operable first rotation inhibiting means operable to inhibit rotation of said carrier and second rotation inhibiting means operable to inhibit relative rotation between said first planet gears and said first sun gear, control structure means operably interconnecting said first and second rotation inhibiting means, and operative to gradually actuate said second rotation inhibiting means in response to gradual actuation of said first rotation inhibiting means, said carrier driving a live gear of a first gear pump for pumping liquid and said first rotation inhibiting means including first throttle structure for throttling the liquid discharge from said first gear pump.

2. The transmission of claim 1 wherein said first sun and planet gears comprise meshed gears of a second gear pump for pumping liquid and said second rotation inhibiting means includes second throttle structure for throttling liquid discharge from said second gear pump.

3. The transmission of claim 2 wherein said transmission includes a closed hydraulic fluid flow system, said first and second gear pumps and said first and second throttle structures being operatively integrated in said hydraulic flow system.

4. The combination of claim 3 wherein said transmission defines a closed cylindrical cavity and said first and second shafts are coaxial with said cavity, said carrier including a closed housing in which said sun gears and said first and second planet gears are journaled, said cavity comprising a portion of said hydraulic fluid flow system, said second gear pump including a hydraulic fluid inlet and a hydraulic fluid outlet opening into said cavity.

5. The transmission of claim 4 wherein said closed housing is disposed at one end of said cavity and axially spaced from the other end thereof, said inlet opening axially outwardly of said housing towards said other end of said cavity.

6. The transmission of claim 5 wherein said second rotation inhibiting means includes a circular partition in said cavity between said housing and said other end of said cavity and snugly slidable and rotatable in said cavity and keyed to said housing for rotation therewith, said partition being axially shiftable in said cavity responsive to hydraulic fluid pressure differential on opposite sides of said partition, said second throttle structure including throttle valve structure carried by said partition and operable to throttle and open said hydraulic fluid outlet of said second gear pump responsive to shifting of said partition toward and away from said housing.

* * * * *